United States Patent
Okubo

(10) Patent No.: US 8,249,310 B2
(45) Date of Patent: Aug. 21, 2012

(54) IMAGE PROCESSING APPARATUS AND METHOD AND PROGRAM

(75) Inventor: Atsushi Okubo, Tokyo (JP)

(73) Assignee: Sony Corporation, Tokyo (JP)

( * ) Notice: Subject to any disclaimer, the term of this patent is extended or adjusted under 35 U.S.C. 154(b) by 1420 days.

(21) Appl. No.: 11/511,151

(22) Filed: Aug. 28, 2006

(65) Prior Publication Data

US 2007/0047775 A1    Mar. 1, 2007

(30) Foreign Application Priority Data

Aug. 29, 2005 (JP) ................. 2005-247936

(51) Int. Cl.
G06K 9/00 (2006.01)

(52) U.S. Cl. .......... 382/118; 348/77; 348/267; 345/615; 382/115; 382/190; 382/206

(58) Field of Classification Search .................. None
See application file for complete search history.

(56) References Cited

U.S. PATENT DOCUMENTS

| | | | | |
|---|---|---|---|---|
| 5,818,954 A * | 10/1998 | Tomono et al. | ............... | 382/115 |
| 6,944,319 B1 * | 9/2005 | Huang et al. | ................. | 382/118 |
| 7,027,620 B2 * | 4/2006 | Martinez | ....................... | 382/118 |
| 7,127,081 B1 * | 10/2006 | Erdem | ........................... | 382/103 |
| 7,127,087 B2 * | 10/2006 | Huang et al. | ................. | 382/118 |
| 7,187,786 B2 * | 3/2007 | Kee | ................... | 382/118 |
| 7,266,224 B2 * | 9/2007 | Sukegawa | ..................... | 382/118 |
| 7,266,225 B2 * | 9/2007 | Mariani et al. | ................ | 382/118 |
| 7,526,123 B2 * | 4/2009 | Moon et al. | ................... | 382/159 |
| 2002/0122593 A1 * | 9/2002 | Kato et al. | .................... | 382/195 |
| 2002/0150280 A1 * | 10/2002 | Li | ................................ | 382/117 |
| 2003/0123713 A1 * | 7/2003 | Geng | ............................ | 382/118 |
| 2004/0086157 A1 * | 5/2004 | Sukegawa | ..................... | 382/115 |
| 2005/0036649 A1 * | 2/2005 | Yokono et al. | ................ | 382/100 |
| 2009/0060290 A1 * | 3/2009 | Sabe et al. | .................... | 382/118 |

FOREIGN PATENT DOCUMENTS

JP    2 187866    7/1990

(Continued)

OTHER PUBLICATIONS

Gao Y et al: "Fast face identification under varying pose from a single 2-D model view" IEE Proceedings: Vision, Image and Signal Processing, Institution of Electrical Engineers, GB, vol. 148, No. 4, Aug. 24, 2001, pp. 248-253, XP006017131 ISSN: 1350-245X.

(Continued)

Primary Examiner — John Lee
(74) Attorney, Agent, or Firm — Frommer Lawrence & Haug LLP; William S. Frommer; Thomas F. Presson

(57) ABSTRACT

An image processing apparatus includes a face-image detector configured to detect a region of a face image from an image supplied thereto. A face-direction detector is configured to detect a direction that a face in the detected face image is facing and a feature-position detector is configured to detect feature positions corresponding to features of the face from the detected face image and the detected face direction. A feature-value calculator is configured to calculate feature values at the detected feature positions and a mapper is configured to map the calculated feature values using predetermined mapping functions. A a recognizer is configured to recognize whether the detected face is a registered face, using the mapped feature values and feature values registered in advance.

16 Claims, 7 Drawing Sheets

FOREIGN PATENT DOCUMENTS

| JP | 2000 322577 | 11/2000 |
|---|---|---|
| JP | 2001 56861 | 2/2001 |
| JP | 2003 281539 | 10/2003 |

OTHER PUBLICATIONS

Xiujuan Chai et al: "Pose normalization using generic 3D face model as a priori for pose-insensitive face recognition" Advances in Biometric Person Authentication. 5th Chinese Conference on Biometric Recognition, Sinobiometrics 2004. Proceedings (Lecture Notes in Computer Science vol. 3338) Springer-Verlag Berlin, Germany, 2004, pp. 144-152, XP002405913 ISBN: 3-540-24029-2.

Xiujuan Chai et al: "Pose Normalization for Robust Face Recognition Based on Statistical Affine Transformation" Information, Communications and Signal Processing, 2003 and Fourth Pacific RIM Conference on Multimedia. Proceedings of the 2003 Joint Conference of the Fourth International Conference on Singapore Dec. 15-18, 2003, Piscataway, NJ, USA,IEEE, vol. 3, Dec. 15, 2003, pp. 1413-1417, XP010701023 ISBN: 0-7803-8185-8.

Haiyuan Wu et al: "Optimal Gabor filters for high speed face identification" Pattern Recognition, 2002. Proceedings. 16th International Conference on Quebec City, Que., Canada Aug. 11-15, 2002, Los Alamitos, CA, USA,IEEE Comput. Soc, US, vol. 1, Aug. 11, 2002, pp. 107-110, XP010613286 ISBN: 0-7695-1695-X.

Yongmin Li et al: "Support vector regression and classification based multi-view face detection and recognition" Automatic Face and Gesture Recognition, 2000. Proceedings. Fourth IEEE International Conference on Grenoble, France Mar. 28-30, 2000, Los Alamitos, CA, USA,IEEE Comput. Soc, US, Mar. 28, 2000, pp. 300-305, XP010378275 ISBN: 0-7695-0580-5.

Cootes T F et al: "View-based active appearance models" Automatic Face and Gesture Recognition, 2000. Proceedings. Fourth IEEE International Conference on Grenoble, France Mar. 28-30, 2000, Los Alamitos, CA, USA,IEEE Comput. Soc, US, Mar. 28, 2000, pp. 227-232, XP010378264 ISBN: 0-7695-0580-5.

Volker Blanz et al., "Face Recognition Based on Fitting a 3D Morphable Model", IEEE Transactions on Pattern Analysis and Machine Intelligence, vol. 25, No. 9, Sep. 2003.

Thomas Maurer, "Single-View Based Recognition of Faces Rotated in Depth[1]", Jun. 26-28, 1995.

* cited by examiner

IMAGE PROCESSING APPARATUS AND METHOD AND PROGRAM

CROSS REFERENCES TO RELATED APPLICATIONS

The present invention contains subject matter related to Japanese Patent Application JP 2005-247936 filed in the Japanese Patent Office on Aug. 29, 2005, the entire contents of which are incorporated herein by reference.

BACKGROUND OF THE INVENTION

1. Field of the Invention

The present invention relates to image processing apparatuses and methods and programs. More specifically, the present invention relates to an image processing apparatus and method and program that serve to recognize an object more accurately.

2. Description of the Related Art

Recently, devices (techniques) for recognizing persons have been developed and are being used. For example, it has been proposed to use techniques for recognizing persons to improve security by checking whether a person entering a certain place is allowed (has a permission) to enter the place. Also, it has been proposed to provide information in accordance with preference of a person recognized using the recognition techniques.

In the techniques for recognizing a person, an image of the face of the person is captured, and matching between the image of the face and a face image registered in advance is checked (the degree of similarity is calculated), thereby executing recognition to determine whether the person is a registered person. When a person is recognized in the manner described above, matching between a face image registered in advance and a face image that is obtained is checked. At this time, the direction of the face in the face image registered in advance and the direction of the face in the face image that is not obtained are not necessarily the same.

In some cases, matching between face images captured from different directions is to be checked, for example, when the face image registered in advance is a face image captured from the front and the face image that is obtained is a face image captured at an oblique angle of 45 degrees. It has been proposed to use a standard three-dimensional model of a human face when matching between face images captured from different directions is to be checked (i.e., when a face captured from a direction different from the direction of the registered face is to be recognized), for example, as described in Japanese Unexamined Patent Application Publication No. 2000-322577.

According to Japanese Unexamined Patent Application Publication No. 2000-322577, it is proposed that, in order to compare two face images captured from different directions, one of the face images is attached (mapped) to a three-dimensional face model to synthesize a face image captured from a direction corresponding to the direction of the other face image, thereby generating face images with the same direction from the face images with different directions to allow face (person) recognition.

Also, according to Volker Blanz et al., "Face Recognition Based on Fitting a 3D Morphable Model", IEEE Transactions on Pattern Analysis and Machine Intelligence, Vol. 25, No. 9, September 2003, it has been proposed to transform a standard three-dimensional face model using various parameters to synthesize face images and to execute face recognition using parameters associated with a face image most approximate to an input face image.

SUMMARY OF THE INVENTION

The face recognition methods according to the related art proposed in Japanese Unexamined Patent Application Publication No. 2000-322577 and "Face Recognition Based on Fitting a 3D Morphable Model" are based on techniques for synthesizing face images with different directions from a standard three-dimensional face model using computer graphics (CG).

In order to create a three-dimensional model, a three-dimensional measurement device with a high accuracy is used. Thus, generation of a three-dimensional model incurs a high cost. Furthermore, a large number of samples are used to create a three-dimensional model. For these reasons, for example, when a face recognition function based on a three-dimensional model is provided in a produce used at home, instead of creating a three-dimensional model from users at home, a three-dimensional model is generated from data obtained from a plurality of persons in advance.

Furthermore, it has been difficult to update the three-dimensional model in accordance with the face of a person that does not match the three-dimensional model, or to transform the three-dimensional model specifically for recognition of a limited number of persons, such as family members. Thus, even though it is possible to favorably recognize a person matching the three-dimensional model, it is not possible to favorably recognize a person not matching the three-dimensional model, and it is difficult to update the three-dimensional model. Accordingly, it has been difficult to improve the accuracy of recognition.

Generally, when a face is recognized, feature values obtained from feature positions and patterns in the face, such as the eyes, the eyebrows, the nose, the mouth, and the contour contribute as feature values for recognition, and values associated with other parts, such as the cheeks, do not considerably contribute as feature values. However, since the methods of face recognition according to the related art synthesize the entire face image, the face image is synthesized including parts that do not contribute to recognition. It is redundant and not efficient for face recognition to execute processing involving parts that do not contribute to recognition.

Furthermore, when the three-dimensional model considerably differs from an actual face, it is not possible to accurately synthesize a face image by applying a standard three-dimensional model and rotating the three-dimensional model as described above, so that the accuracy of recognition is degraded. Furthermore, it takes calculation time and increases processing load to obtain approximated images by transforming the three-dimensional model using parameters.

Although the above description has been given in the context of face recognition as an example, face recognition techniques can be applied, for example, to recognition of objects such as automobile. Also in such cases, the problems of increased processing time and processing load could arise.

It is desired that the accuracy of recognition of faces or predetermined objects be improved and that the processing time and load for recognition be reduced.

An image processing apparatus according to an embodiment of the present invention includes face-image detecting means for detecting a region of a face image from an image supplied thereto; face-direction detecting means for detecting a direction that a face in the face image detected by the face-image detecting means is facing; feature-position detecting means for detecting feature positions corresponding to features of the face from the face image detected by the face-image detecting means and the direction of the face detected by the face-direction detecting means; feature-value calculating means for calculating feature values at the feature positions detected by the feature-position detecting means; mapping means for mapping the feature values calculated by the feature-value calculating means, using predetermined mapping functions; and recognizing means for recognizing whether the face detected by the face-image detecting means is a registered face, using the feature values mapped by the mapping means and feature values registered in advance.

The feature-value calculating means may calculate the feature values using Gabor filters or Gaussian derivative filters.

The mapping means may use support-vector-regression functions as the mapping functions.

The mapping means may map at least one component among components of the feature values calculated by the feature-value calculating means, using the mapping functions.

The image processing apparatus may further include updating means for updating the mapping functions when a result of recognition by the recognizing means is incorrect.

An image processing method or program according to the first embodiment of the present invention includes detecting a region of a face image from an image supplied; detecting a direction that a face in the detected face image is facing; detecting feature positions corresponding to features of the face from the detected face image and the detected direction of the face; calculating feature values at the detected feature positions; mapping the calculated feature values using predetermined mapping functions; and recognizing whether the detected face is a registered face using the mapped feature values and feature values registered in advance.

An image processing apparatus according to a second embodiment of the present invention includes detecting means for detecting a predetermined object from an image supplied thereto; direction detecting means for detecting a direction that the object detected by the detecting means is facing; feature-position detecting means for detecting feature positions corresponding to features of the object from the object detected by the detecting means and the direction of the object detected by the direction detecting means; feature-value calculating means for calculating feature values at the feature positions detected by the feature-position detecting means; mapping means for mapping the feature values calculated by the feature-value calculating means, using predetermined mapping functions; and recognizing means for recognizing whether the object detected by the detecting means is a registered object, using the feature values mapped by the mapping means and feature values registered in advance.

The feature-value calculating means may calculate the feature values using Gabor filters or Gaussian derivative filters.

The mapping means may use support-vector-regression functions as the mapping functions.

The mapping means may map at least one component among components of the feature values calculated by the feature-value calculating means, using the mapping functions.

The image processing apparatus may further include updating means for updating the mapping functions when a result of recognition by the recognizing means is incorrect.

An image processing method or program according to the second embodiment of the present invention includes detecting a predetermined object from an image supplied; detecting a direction that the detected object is facing; detecting feature positions corresponding to features of the object from the detected object and the detected direction of the object; calculating feature values at the detected feature positions; mapping the calculated feature values using predetermined mapping functions; and recognizing whether the detected object is a registered object using the mapped feature values and feature values registered in advance.

According to the first embodiment of the present invention, when the direction of a face in a face image obtained differs from the direction of a face in a face image used for recognition, feature values extracted from the face image obtained are mapped using mapping functions, and matching with the face image used for recognition is checked using the mapped feature values and feature values extracted from the face image used for recognition.

According to the second embodiment of the present invention, when the direction of an object in an image obtained differs from the direction of an object in an image used for recognition, feature values extracted from the object image obtained are mapped using mapping functions, and matching with the object image used for recognition is checked using the mapped feature values and feature values extracted from the object image used for recognition.

As described above, according to the first embodiment of the present invention, it is possible to recognize a human face.

Furthermore, according to the first embodiment of the present invention, when the direction of a face in a face image obtained differs from the direction of a face in a face image used for recognition, feature values extracted from the face image obtained are mapped using mapping functions, and matching with the face image used for recognition is checked using the mapped feature values and feature values extracted from the face image used for recognition. Thus, the amount of calculation can be reduced.

According to the second embodiment of the present invention, it is possible to recognize a predetermined object.

Furthermore, according to the second embodiment of the present invention, when the direction of an object in an image obtained differs from the direction of an object in an image used for recognition, feature values extracted from the object image obtained are mapped using mapping functions, and matching with the object image used for recognition is checked using the mapped feature values and feature values extracted from the object image used for recognition. Thus, the amount of calculation can be reduced.

DESCRIPTION OF THE PREFERRED EMBODIMENTS

Before describing embodiments of the present invention, examples of correspondence between the features of the present invention and embodiments described in the specification will be described below. This description is intended to assure that embodiments supporting the present invention are described in this specification. Thus, even if a certain embodiment is not described herein as corresponding to certain features of the present invention, that does not necessarily mean that the embodiment does not correspond to those features. Conversely, even if an embodiment is described herein as corresponding to certain features, that does not necessarily mean that the embodiment does not correspond to other features.

Figure 1:
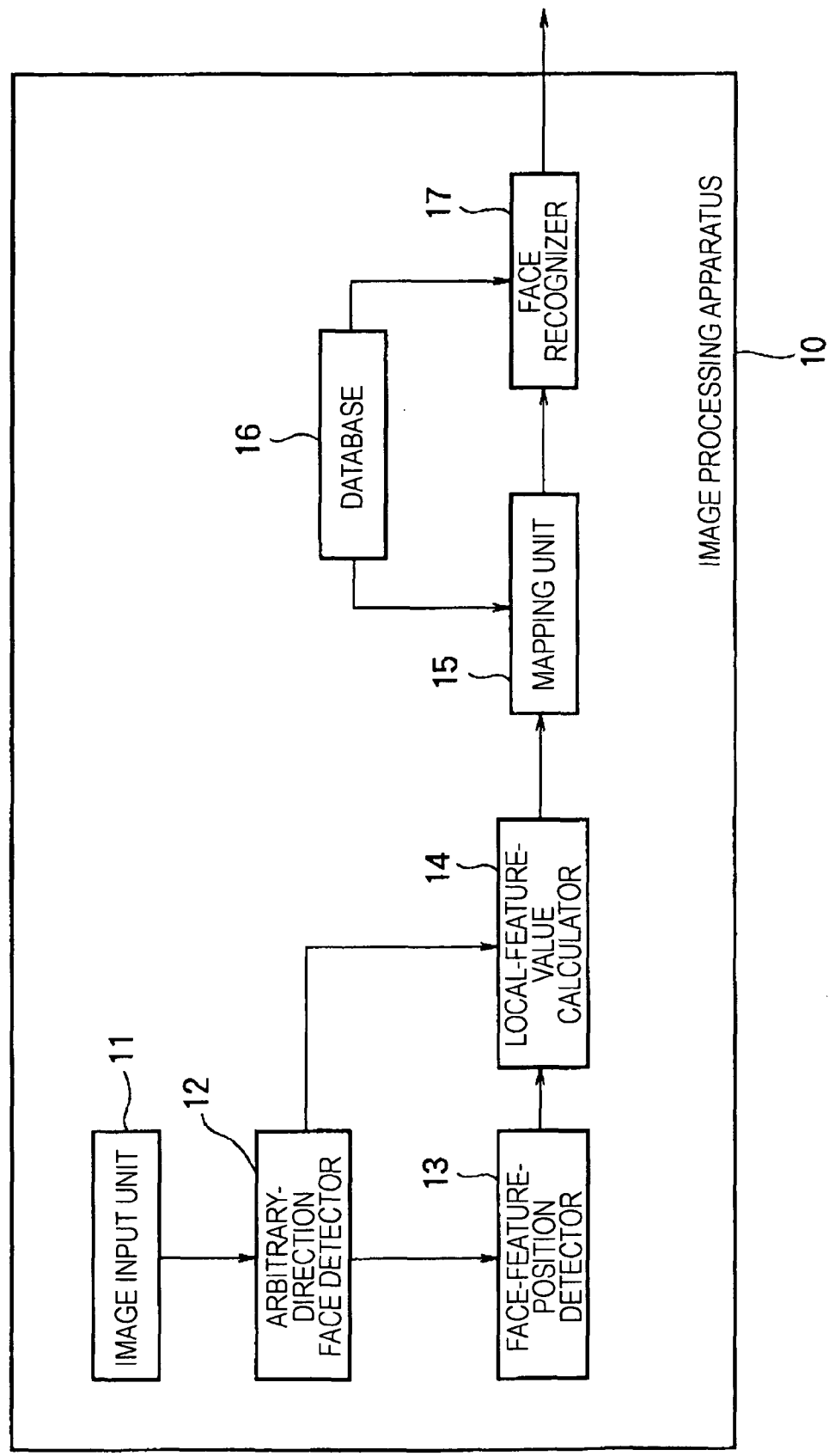
FIG. 1 is a diagram showing an example of the configuration of an image processing apparatus according to an embodiment of the present invention.

An image processing apparatus according to an embodiment of the present invention includes face-image detecting means (e.g., an image input unit 11 and an arbitrary-direction face detector 12 shown in FIG. 1) for detecting a region of a face image from an image supplied thereto; face-direction detecting means (e.g., the arbitrary-direction face detector 12 shown in FIG. 1) for detecting a direction that a face in the face image detected by the face-image detecting means is facing; feature-position detecting means (e.g., a face-feature-position detector 13 shown in FIG. 1) for detecting feature positions corresponding to features of the face from the face image detected by the face-image detecting means and the direction of the face detected by the face-direction detecting means; feature-value calculating means (e.g., a local-feature-value calculator 14 shown in FIG. 1) for calculating feature values at the feature positions detected by the feature-position detecting means; mapping means (e.g., a mapping unit 15 shown in FIG. 1) for mapping the feature values calculated by the feature-value calculating means, using predetermined mapping functions; and recognizing means (e.g., a face recognizer 17 shown in FIG. 1) for recognizing whether the face detected by the face-image detecting means is a registered face, using the feature values mapped by the mapping means and feature values registered in advance.

The image processing apparatus may further include updating means (e.g., a function updater 109 shown in FIG. 5) for updating the mapping functions when a result of recognition by the recognizing means is incorrect.

An image processing apparatus according to a second embodiment of the present invention includes detecting means (e.g., the image input unit 11 and the arbitrary-direction face detector 12 shown in FIG. 1) for detecting a predetermined object from an image supplied thereto; direction detecting means (e.g., the arbitrary-direction face detector 12 shown in FIG. 1) for detecting a direction that the object detected by the detecting means is facing; feature-position detecting means (e.g., the face-feature-position detector 13 shown in FIG. 1) for detecting feature positions corresponding to features of the object from the object detected by the detecting means and the direction of the object detected by the direction detecting means; feature-value calculating means (e.g., the local-feature-value calculator 14 shown in FIG. 1) for calculating feature values at the feature positions detected by the feature-position detecting means; mapping means (e.g., the mapping unit 15 shown in FIG. 1) for mapping the feature values calculated by the feature-value calculating means, using predetermined mapping functions; and recognizing means (e.g., the face recognizer 17 shown in FIG. 1) for recognizing whether the object detected by the detecting means is a registered object, using the feature values mapped by the mapping means and feature values registered in advance.

Now, embodiments of the present invention will be described with reference to the drawings.

Configuration of Image Processing Apparatus

FIG. 1 is a diagram showing the configuration of an image processing apparatus according to an embodiment of the present invention. An image processing apparatus 10 shown in FIG. 1 will be described as a device for recognizing a human face. Although the description will be given herein in the context of an example where a human face is recognized, the present invention can be applied, for example, to recognition of an object, such as recognition of an automobile, and application of the present invention is not limited face recognition. The description will be continued assuming that the image processing apparatus 10 shown in FIG. 1 is an apparatus that processes an image of a human face in order to recognize a human face.

The image processing apparatus 10 includes an image input unit 11, an arbitrary-direction face detector 12, a face-feature-position detector 13, a local-feature-value calculator 14, a mapping unit 15, a database 16, and a face recognizer 17.

Although the description will be continued herein assuming that the image processing apparatus 10 includes the database 16, alternatively, the database 16 may be connected to the image processing apparatus 10 via a network or the like. When the database 16 is connected via a network or the like, the single database 16 can be shared by a plurality of image processing apparatuses 10.

The image input unit 11 includes, for example, a camera, and it has a function of capturing an image of a person (a function of receiving input of a captured image of a person). An image input to the image input unit 11 at least includes a portion corresponding to a human face. The image input to (obtained by) the image input unit 11 is supplied to the arbitrary-direction face detector 12.

The arbitrary-direction face detector 12 analyzes the image supplied from the image input unit 11 to extract a portion corresponding to a human face (position and size) and detect a direction of the face. The image supplied from the image input unit 11 includes a face of a user, but may be an image including portions not corresponding to the face. For example, the image may be a full-length photograph of a person. The arbitrary-direction face detector 12 detects the position and size of the face in such an image. That is, the arbitrary-direction face detector 12 recognizes a region of a human face in the image supplied from the image input unit 11 and extracts an image of the human face.

The arbitrary-direction face detector 12 also detects a direction the extracted face is facing. The direction of the face is detected so that information representing the direction of the human face can be used for personal recognition in later processing.

The image of the face (face image) and the direction of the face (face-direction information) detected by the arbitrary-direction face detector 12 are supplied to the face-feature-position detector 13. The face-feature-position detector 13 detects portions that serve as features in the human face (i.e., face-feature positions) from the face image supplied thereto. For example, the face-feature positions correspond to the eyes, nose, and mouth.

The face-feature positions detected by the face-feature-position detector 13 are supplied to the local-feature-value calculator 14. The local-feature-value calculator 14 calculates feature values from images in the proximities of the face-feature positions supplied thereto. The feature values calculated by the local-feature-value calculator 14 are supplied to the mapping unit 15.

The mapping unit 15 also receives data stored in the database 16. The database 16 stores mapping functions (described later in detail), and data of a human face image relevant to recognition (hereinafter referred to as registered face-image data). The mapping unit 15 executes processing using the mapping functions managed in the database 16 so that the face image represented by the registered face-image data obtained from the database 16 and the face image input to the image input unit 11 can be treated as images captured from the same direction.

That is, the mapping unit 15 processes the face image input to the image input unit 11 so that the direction of the face in the face image (the direction from which the image was captured) coincides with the direction of the face registered in the database 16, or processes the face image registered in the database 16 so that the direction of the face in the face image coincides with the direction of the face in the face image input to the image input unit 11.

The description will be continued assuming that the mapping unit 15 processes the face image input to the image input unit 11 so that the direction of the face in the face image (the direction from which the image was captured) coincides with the direction of the face in the face image registered in the database 16.

Referring to the configuration of the image processing apparatus 10 shown in FIG. 1, the mapping unit 15 receives input of feature values calculated by the local-feature-value calculator 14. The feature values are calculated (extracted) by the local-feature-value calculator 14 from the face image input to the image input unit 11.

The mapping unit 15 converts (maps) the feature values supplied thereto to feature values in a case where the image was taken from the direction of the face in the face image represented by the registered face-image data registered in the database 16. The mapped feature values are supplied to the face recognizer 17.

The face recognizer 17 also receives the registered face-image data from the database 16. The face recognizer 17 compares the feature values supplied from the mapping unit 15 with the registered face-image data supplied from the database 16 to check matching with the registered person. Since the feature values supplied from the mapping unit 15 are compared with the registered face-image data as described above, the registered face-image data specifically represents feature values obtained from the registered face image relevant to recognition.

As described above, the image processing apparatus 10 in this embodiment recognizes a human face by comparing feature values. The feature values are mapped to obtain data extracted from face images captured from the same direction. Thus, the amount of computation is reduced compared with the method that has hitherto been used in which a face image is mapped (attached) to a three-dimensional model and the three-dimensional model is rotated in a predetermined direction. Furthermore, with the reduced amount of computation, the time taken for the computation can also be reduced.

As described above, in this embodiment, mapping is executed so that the feature values used for comparison can be treated as feature values extracted from face images captured from the same direction. At the time of the mapping, information representing the direction and angle that the human face in the captured (input) image is facing is used. In the configuration shown in FIG. 1, the arbitrary-direction face detector 12 detects the direction of the human face and outputs information regarding the face direction. For example, when the precision of detection of the face direction by the arbitrary-direction face detector 12 is higher than the precision suitable for processing executed at a subsequent stage (e.g., processing executed by the face-feature-position detector 13), or when the face direction is detected by a part other than the arbitrary-direction face detector 12, the image processing apparatus 10 is configured as shown in FIG. 2.

Figure 2:
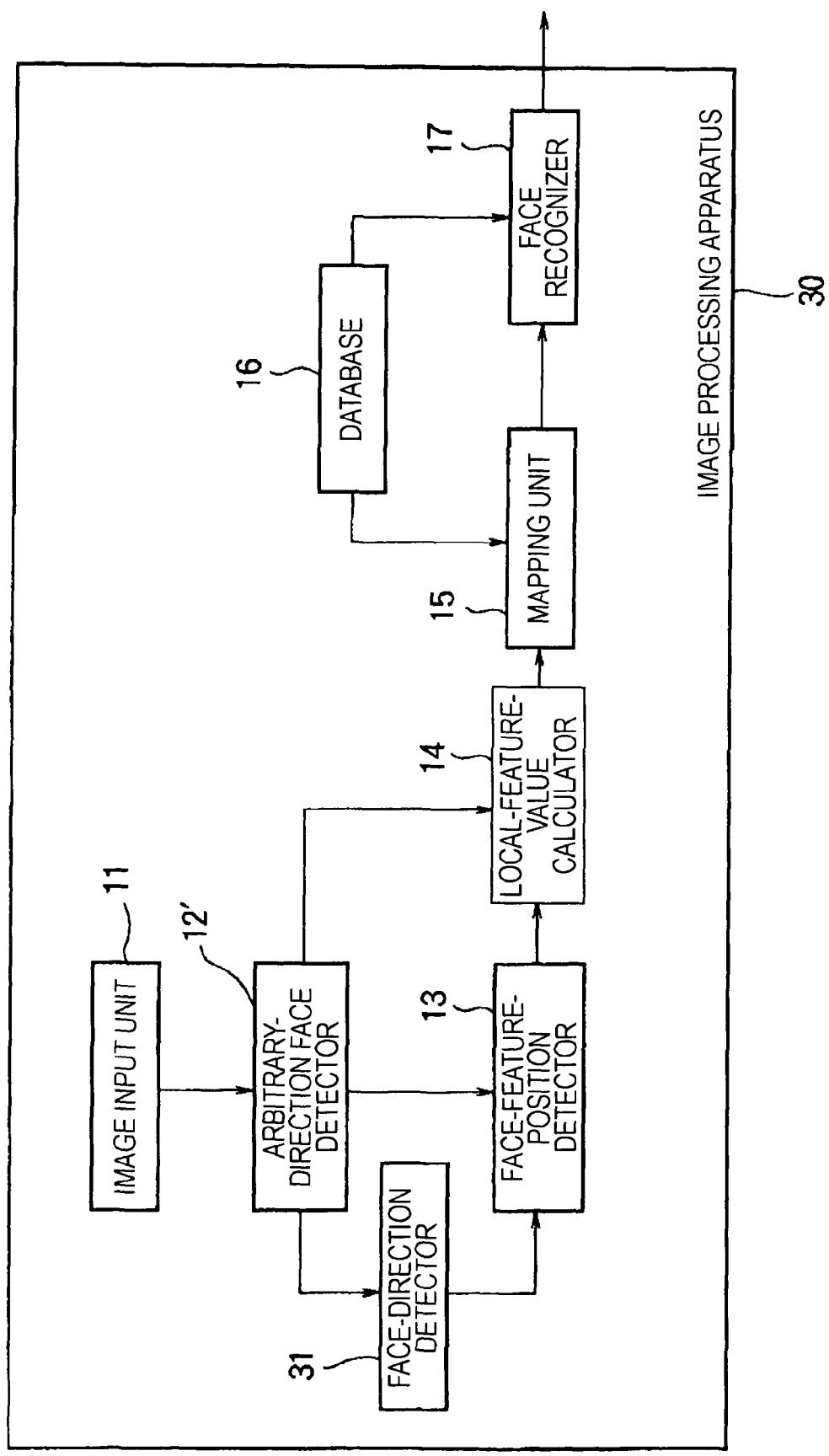
FIG. 2 is a diagram showing another example of the configuration of an image processing apparatus.

FIG. 2 is a diagram showing another example of the configuration of an image processing apparatus. As compared with the image processing apparatus 10 shown in FIG. 1, an image processing apparatus 30 shown in FIG. 2 additionally includes a face-direction detector 31. An arbitrary-direction face detector 12' in the image processing apparatus 30 may be the same as the arbitrary-direction face detector 12 shown in FIG. 1, or has a lower precision of detection of the face direction than the arbitrary-direction face detector 12 shown in FIG. 1. Thus, the arbitrary-direction face detector 12' shown in FIG. 2 has a dash (') attached to the reference sign for the purpose of distinction from the arbitrary-direction face detector 12 shown in FIG. 1.

With the face-direction detector 31 added, the face image and the face-direction information are supplied from the arbitrary-direction face detector 12' to the face-direction detector 31. Also, the face image is supplied to the face-feature-position detector 13.

The face-direction detector 31 detects a face direction from the face image and the face-direction information supplied thereto. The face direction (face-direction information) detected is supplied to the face-feature-position detector 13.

When the configuration is such that the face direction is detected by the face-direction detector 31, the detection of the face direction in the arbitrary-direction face detector 12' may be omitted. Alternatively, the face direction may be detected roughly by the arbitrary-direction face detector 12' and specifically by the face-direction detector 31. The precision of detection of the face direction by the face-direction detector 31 is chosen so as to be sufficient for processing executed at a subsequent stage.

The description will be continued in the context of the image processing apparatus 10 shown in FIG. 1 as an example.

Operation of the Image Processing Apparatus

An operation (face recognition) of the image processing apparatus 10 (FIG. 1) will be described with reference to a flowchart shown in FIG. 3.

In step S11, the image input unit 11 receives input of (obtains) a face image. Although a face image is input in this example, the image input to the image input unit 11 may be any image including a face. The face image input to the image input unit 11 is supplied to the arbitrary-direction face detector 12. In step S12, the arbitrary-direction face detector 12 detects the position of the face, the size of the face, and the direction of the face in the image supplied thereto. By detecting the position and size of the face, a region of the face image is extracted, and the extracted region of the face image is supplied to the face-feature-position detector 13 and the local-feature-value calculator 14. The information regarding the direction of the face (face-direction information), detected by the arbitrary-direction face detector 12, is supplied to the face-feature-position detector 13.

The face-feature-position detector 13 detects feature parts (face-feature positions) of the face, such as the eyes, the nose, and the mouth, using the face image and the face-direction information supplied thereto. The face-feature-position detector 13 can detect feature positions, for example, by a method called AAM (Active Appearance Models). AAM is described in T. F. Cootes, G. J. Edwards, and C. J. Taylor, "Active Appearance Models", Proc. Fifth European Conf. Computer Vision, H. Burkhardt and B. Neumann, eds, vol. 2, pp. 484-498, 1998.

A feature of the method of AAM is that it is possible to precisely detect face-feature positions of face images with directions in a predetermined limited range. Thus, when face-feature positions are detected using the method of AAM, an arrangement is provided so that face-feature positions are detected on a direction-specific basis for each direction range in which face-feature positions can be detected precisely. For example, a plurality of detectors (not shown) for detecting face-feature positions are provided for individual directions, and the detectors are switched according to the direction represented by the face-direction information.

That is, when the detection of face-feature positions by the face-feature-position detector 13 is executed by the method of AAM, the face-feature-position detector 13 selects an appropriate detector on the basis of the face-direction information supplied thereto, and supplies the face image to the selected detector so that face-feature positions will be detected therein.

When the face-feature-position detector 13 is configured so as to detect face-feature positions in the manner described above, face-direction information is used. When the precision of face-direction information appropriate for the face-feature-position detector 13 does not match the precision of the face-direction information output from the arbitrary-direction face detector 12, the face-direction detector 31 for adjusting precision is provided between the arbitrary-direction face detector 12' and the face-feature-position detector 13, as shown in FIG. 2.

Figure 3:
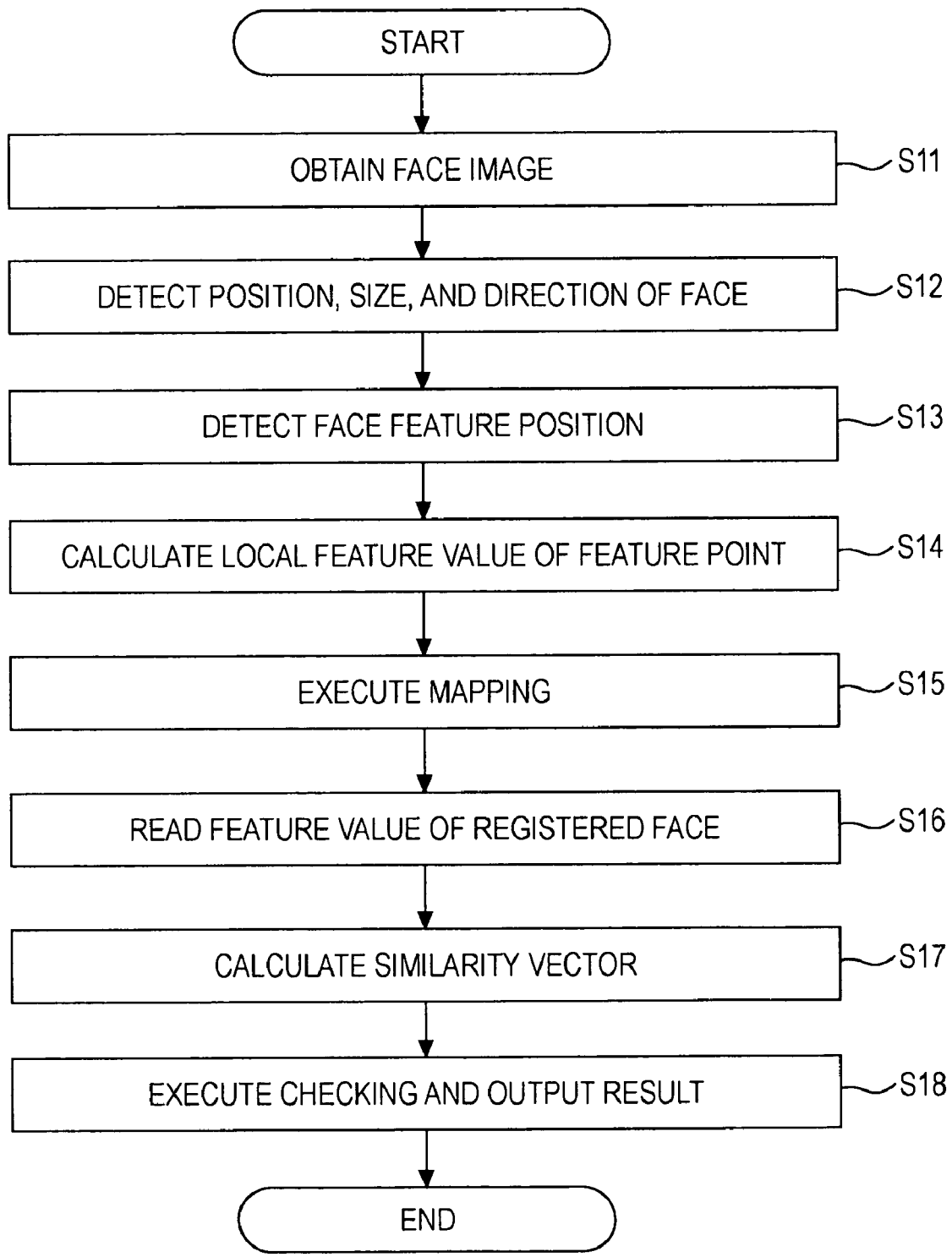
FIG. 3 is a flowchart of an operation of an image processing apparatus.

Referring back to the flowchart shown in FIG. 3, in step S12, the face-direction information having a precision appropriate for processing executed by the face-feature-position detector 13 is output to the face-feature-position detector 13. Then, in step S13, the face-feature-position detector 13 detects face-feature positions.

In step S13, the face-feature-position detector 13 detects feature positions of the face (face-feature positions), for example, by the method of AAM as described earlier. For example, the face-feature positions detected by the face-feature-position detector 13 are positions shown in parts A and B of FIG. 4.

Figure 4:
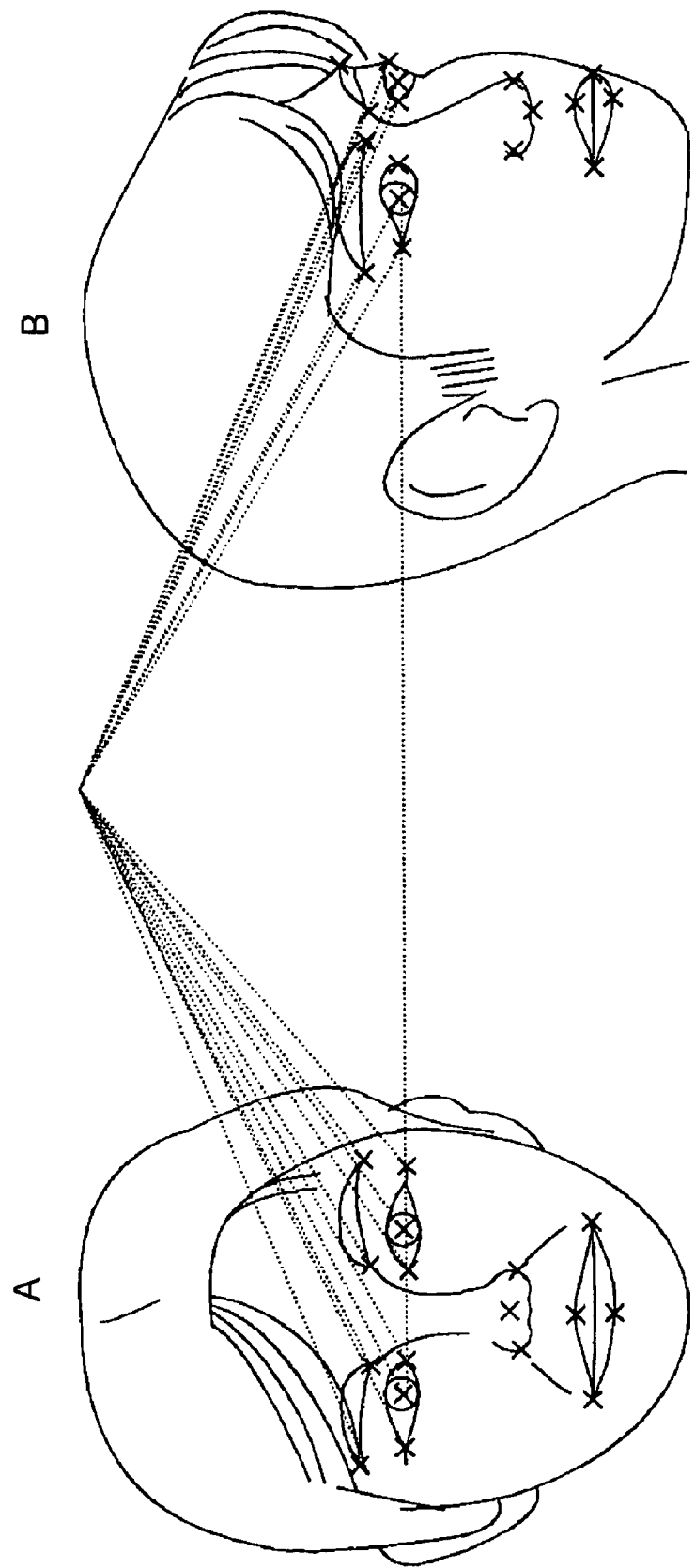
FIG. 4 is a diagram for explaining feature positions.

Part A of FIG. 4 shows face-feature positions detected from a face image captured from the front. Part B of FIG. 4 shows face-feature positions detected from a face image captured at an oblique angle of 45 degrees. In parts A and B of FIG. 4, the positions detected as face-feature positions are indicated by x marks.

Referring to part A of FIG. 4, the positions detected as face-feature positions are the ends of the eyebrows (two points for each of the right eyebrow and the left eyebrow, i.e., four points in total), the ends and centers (irises) of the eyes (three points for each of the right eye and the left eye, i.e., six points in total), the ends and center of the nose (three points in total), and the ends and centers of the mouth (two points on either end, one point at the center of the upper lip, and one point at the center of the lower lip, i.e., four point in total). As described above, 17 points in total are detected as face-feature positions from the face image.

Referring to part B of FIG. 4, similarly to the case shown in part A of FIG. 4, 17 positions in total corresponding to the positions detected from a face image captured from the front are detected. The description will be continued assuming that 17 feature positions are extracted from a face image in this embodiment as described above.

In parts A and B of FIG. 4, corresponding points among the feature positions (indicated by x marks) are connected by dotted lines to indicate the corresponding relationships (dotted lines representing corresponding relationships are shown only for the feature positions of the eyebrows and the eyes).

The face-feature-position detector 13 detects feature positions, such as those shown in part A or B of FIG. 4, from the input face image. Information regarding the feature positions detected by the face-feature-position detector 13 (feature-position information) is supplied to the local-feature-value calculator 14. The local-feature-value calculator 14 also receives the face image from the arbitrary-direction face detector 12 (when the face image is the same as the face image supplied to the face-feature-position detector 13, the face image may be supplied from the face-feature-position detector 13 together with the feature-position information).

The local-feature-value calculator 14 calculates local feature values. The local-feature-value calculator 14 may calculate local feature values using images in the proximities of the feature positions directly, or using a convolution operation based on a Gabor filter or a Gaussian derivative filter. The description will be continued assuming that local feature values are extracted using a Gabor filter.

Now, processing executed by a Gabor filter (Gabor filtering) will be described. It is known that cells having selectivity for specific directions exist. The cells include cells responsive to vertical lines and cells responsive to horizontal lines. Similarly, Gabor filtering is a type of spatial filtering that can be achieved by a plurality of filters having directional selectivity.

A Gabor filter can be spatially represented by a Gabor function. A Gabor function $g(x, y)$ is defined by a carrier $s(x, y)$ representing a cosine component and an envelope $W_r(x, y)$ having a two-dimensional Gaussian distribution, as expression in the following expression:

$$g(x, y) = s(x, y) w_r(x, y) \quad (1)$$

The carrier $s(x, y)$ can be expressed as in expression (2) below using a complex function, in which coordinate values $(u_0, v_0)$ represent spatial frequencies and P denotes the phase of the cosine component:

$$s(x, y) = \exp(j(2\pi(u_0 x + v_0 y) + P)) \quad (2)$$

The carrier in expression (2) can be separated into a real component $Re(s(x, y))$ and an imaginary component $Im(s(x, y))$, as expressed in expression (3) below:

$$Re(s(x, y)) = \cos(2\pi(u_0 x + v_0 y) + P)$$

$$Im(s(x, y)) = \sin(2\pi(u_0 x + v_0 y) + P) \quad (3)$$

The envelope having the two-dimensional Gaussian distribution can be expressed as in the following expression:

$$w_r(x, y) = K \exp(-\pi(a^2 (x-x_0)_r^2 + b^2 (y-y_0)_r^2)) \quad (4)$$

The coordinate values $(x0, y0)$ represent a peak of this function, and the constants a and b are scale parameters of the Gaussian distribution. The index r denotes a rotation operation expressed by expressions below:

$$(x-x_0)_r = (x-x_0)\cos\theta + (y-y_0)\sin\theta$$

$$(y-y_0)_r = -(x-x_0)\sin\theta + (y-y_0)\cos\theta \quad (5)$$

Thus, from expressions (2) and (4) given above, the Gabor filter can be expressed as a spatial function expressed by the following expression:

$$g(x, y) = K \exp(-\pi(a^2 (x-x_0)_r^2 + b^2 (y-y_0)_r^2))$$

$$\exp(j(2\pi(u_0 x + v_0 y) + P)) \quad (6)$$

In this embodiment, the local-feature-value calculator 14 calculates local feature values for individual feature positions, such as the eyes, the mouth, and the nose of the face, using 17 Gabor filters in total.

The response of the Gabor filters can be expressed by the following expression, where Gi denotes the i-th Gabor filter, Ji denotes the result of filtering (Gabor Jet) by the i-th Gabor filter, and I denotes an input image:

$$j_i(x, y) = G_i(x, y) \otimes I(x, y) \quad (7)$$

Actually, the calculation according to expression (7) can be executed quickly using fast Fourier transform.

In the following description, local feature values of predetermined feature positions, calculated according to expression (7), are defined as a local-feature-value vector as expressed in expression (8) below:

$$J_i^0 = \{j_{i-1}^0, j_{i-2}^0, \ldots, j_{i-n}^0\} \quad (8)$$

In expression (8), of the indices of the letter J on the left-hand side, the upper index is a numeral that denotes the angle of the image captured (i.e., the face direction detected by the arbitrary-direction face detector 12), and the lower index is a numeral identifying one of the 17 feature positions. For example, the upper index of J is "0" when the image was captured from the front, and the upper index of J is "45" when the image was captured at an angle of 45 degrees. Expression (8) represents a local-feature-value vector regarding a face image captured from the front.

Furthermore, referring to part A of FIG. 4, for example, when numbers are sequentially assigned to the feature positions in order of "0" for the left feature position of the left eyebrow as viewed in the figure, "1" for the right feature position of the left eyebrow as viewed in the figure, and so forth, the lower index of J ranges from 0 to 16. For example, the lower index of J is "0" in the case of a local-feature-value vector regarding the left feature position of the left eyebrow as viewed in the figure.

The right-hand side of expression (8) represents components of the local-feature-value vector. Regarding the indices of j representing each component, similarly to the indices of J on the left-hand side, the upper index is a numeral that denotes the angle of the image captured, and the lower index is a numeral identifying each component.

As described above, local-feature-value vectors are calculated individually for the 17 points in this case. The local-feature-value vectors calculated by the local-feature-value calculator 14 are supplied to the mapping unit 15. In cases where mapping should be executed regarding the input local-feature-value vectors, the mapping unit 15 executes mapping in step S15.

Referring back to parts A and B of FIG. 4, the "cases where mapping should be executed" will be described. Before the description, however, data that has been registered in the database 16 will be described. In the database 16, mapping functions and data regarding a face image of a person relevant to recognition (registered face-image data) are stored. The registered face-image data is data at least including local-feature-value vectors extracted from a face image of a person relevant to recognition.

For example, a set of 17 local-feature-value vectors calculated according to expression (8) are registered for each person (i.e., for each face image), as expressed in expression (9) below:

$$J_1^0 = \{j_{1-1}^0, j_{1-2}^0, j_{1-3}^0, \ldots, j_{1-n}^0\} \quad (9)$$
$$J_2^0 = \{j_{2-1}^0, j_{2-2}^0, j_{2-3}^0, \ldots, j_{2-n}^0\}$$
$$J_3^0 = \{j_{3-1}^0, j_{3-2}^0, j_{3-3}^0, \ldots, j_{3-n}^0\}$$
$$\vdots$$
$$J_{16}^0 = \{j_{16-1}^0, j_{16-2}^0, j_{16-3}^0, \ldots, j_{16-n}^0\}$$

As described above, the registered face-image data (local-feature-value vectors) registered in the database 16 includes a set of local-feature-value vectors extracted from a face image captured from a predetermined direction. For example, a set of local-feature-value vectors (expressed by expression (9)) extracted from a face image of a face captured from the front (herein referred to as a registered face), as shown in part A of FIG. 4, is registered in the database 16.

However, the face image of the face input to the image input unit 11 (herein referred to as an input face) may be, for example, a face image of a face captured from an oblique direction instead of a face captured from the front (as opposed to the registered face), as shown in part B of FIG. 4. Basically, local-feature-value vectors are calculated from 17 feature positions regarding a face image of an input face captured from an oblique direction as shown in part B of FIG. 4.

Determination (recognition) as to whether the face image corresponds to the person registered in the database 16 is executed using the local-feature-value vectors of the face registered in the database 16 (registered face) and the local-feature-value vectors extracted from the face image of the face input to the image input unit 11 (input face). When the directions of the registered face and the input face differ, for example, as shown in parts A and B of FIG. 4, it is not allowed to execute recognition simply using the local-feature-value vectors extracted from the registered face and the local-feature-value vectors extracted from the input face (such an attempt would fail to obtain an accurate result of recognition and degrades the accuracy of recognition).

That is, the accuracy of recognition is degraded unless local-feature-value vectors extracted from the registered face and local-feature-value vectors extracted from an input face captured from the same direction as the registered face are used.

When the directions of the input face and the registered face differ, the input face and the registered face look considerably different on images, so that even if local-feature-value vectors are extracted from face images of the same person, the values thereof considerably differ. Thus, when the degree of similarity between the registered face and the input face is calculated for recognition, if the directions of the input face and the registered face differ, it is difficult to achieve accurate recognition simply by directly comparing local-feature-value vectors.

In order to overcome this problem and to achieve accurate recognition even when the directions of the input face and the registered face differ, according to techniques that have hitherto been used, an input face with the same direction as the registered face is synthesized using a three-dimensional face model. According to the techniques, however, the amount of computation increases, and the accuracy of recognition is degraded when the three-dimensional model is not suitable for the person relevant to recognition (i.e., the person registered in the database 16).

In this embodiment, since a three-dimensional model is not used, the amount of computation is reduced compared with the case where a three-dimensional model is used. Furthermore, since a three-dimensional model is not used, the problem of degradation in the accuracy of recognition caused by mismatch between the person relevant to recognition and the three-dimensional model can be avoided.

In this embodiment, local-feature-value vectors are mapped using mapping functions so that the difference between the directions of the input face and the registered face is absorbed for recognition.

Referring back to the flowchart shown in FIG. 3, in step S15, the mapping unit 15 executes mapping. The mapping unit 15 determines that "mapping should be executed" when an input face having a direction different from the direction of the registered face registered in the database 16 is input. When mapping should be executed, mapping is executed according to mapping functions registered in the database 16. When mapping need not be executed, mapping by the mapping unit 15 may be skipped so that local-feature-value vectors from the local-feature-value calculator 14 are supplied directly to the face recognizer 17. Alternatively, mapping may be executed using mapping functions that do not substantially execute mapping (i.e., the does not change data values) before local-feature-value vectors from the local-feature-value calculator 14 are supplied to the face recognizer 17.

The mapping executed by the mapping unit 15 will be described in the context of an example where the registered face registered in the database 16 is a face captured from the front as shown in part A of FIG. 4, a set of local-feature-value vectors extracted from the registered face are registered in the database 16, the input face is a face captured at an oblique angle of 45 degrees as shown in part B of FIG. 4, and local-feature-value vectors extracted from the input face are supplied to the mapping unit 15.

In this case, the local-feature-value vectors calculated by the local-feature-value calculator 14 and supplied to the mapping unit 15 can be expressed by expression (10) below, where i for identifying face-feature positions ranges from 0 to 16:

$$J_i^{45} = \{j_{i-1}^{45}, j_{i-2}^{45}, \ldots, j_{i-n}^{45}\} \tag{10}$$

Expression (10) represents local-feature-value vectors extracted from a face image captured at an oblique angle of 45 degrees, and the local-feature-value vectors are mapped so that the local-feature-value vectors can be considered as local-feature-value vectors extracted from a face image captured at an angle of 0 degrees (from the front). The mapping transforms expression (10) to expression (11) below:

$$\tilde{J}_i^{0} = \{\tilde{j}_{i-1}^{0}, \tilde{j}_{i-2}^{0}, \ldots, \tilde{j}_{i-n}^{0}\} \tag{11}$$

In expression (11), "~" above J or j indicates that the value is an approximate value. It is understood that expression (8) representing local-feature-value vectors extracted from the registered face and expression (11) obtained by mapping of expression (10) representing local-feature-value vectors extracted from the input face are in a relationship of approximation.

The components of expression (11) (the components in { } on the right-hand side of expression (11) are calculated according to expression (12) below:

$$\tilde{j}_{i-1}^{0} = f_{i-1}^{45}(j_{i-1}^{45}, j_{i-2}^{45}, \ldots, j_{i-n}^{45})$$
$$\tilde{j}_{i-2}^{0} = f_{i-2}^{45}(j_{i-1}^{45}, j_{i-2}^{45}, \ldots, j_{i-n}^{45})$$
$$\vdots$$
$$\tilde{j}_{i-n}^{0} = f_{i-n}^{45}(j_{i-1}^{45}, j_{i-2}^{45}, \ldots, j_{i-n}^{45}) \tag{12}$$

That is, each component j in expression (11) is calculated according to predetermined mapping functions f using all the components in expression (10) (n components j from i−1 to i−n). The mapping functions f are registered in the database 16, and a mapping function f associated with the direction of the input face is read and used. That is, in this case, the mapping function f for the case of 45 degrees is read and used. The mapping functions f are prepared individually for face-feature positions. That is, since 17 face-feature positions exist in this case, 17 mapping functions f are prepared (registered) for each direction.

The mapping executed by the mapping unit 15 can be expressed generally as follows:

$$J_i^{\theta_I} = \{j_{i-1}^{\theta_I}, j_{i-2}^{\theta_I}, \ldots, j_{i-n}^{\theta_I}\} \tag{13}$$

$$J_i^{\theta_R} = \{j_{i-1}^{\theta_R}, j_{i-2}^{\theta_R}, \ldots, j_{i-n}^{\theta_R}\} \tag{14}$$

$$\tilde{j}_{i-k}^{\theta_R} = f_{i-k}^{\theta_I, \theta_R}(j_{i-1}^{\theta_I}, j_{i-2}^{\theta_I}, \ldots, j_{i-n}^{\theta_I}) \, (k=1, \ldots, n) \tag{15}$$

Expression (13) represents the local-feature-value vector at a feature position i of the input face. Expression (14) represents the local-feature-value vector at the feature position i of the registered face. The mapping of the feature value in this case can be expressed as expression (15).

In expression (15), the left-hand side represents an estimate of the k-th component of the local-feature-value vector at the feature position i. Of the right-hand side of expression (15), the term expressed below represents a mapping function that maps the k-th component of the local-feature-value vector at the feature position i of the face image of the registered face with an angle of $\theta_R$ using all the components of the local-feature-value vector at the feature position i of the face image of the input face with an angle of $\theta_I$.

$$f_{i-k}^{\theta_I, \theta_R}() \tag{16}$$

Although mapping is executed using all the components in this example, all the components need not necessarily be used. For example, minimum components that are to be used for estimation may be determined so that only those components are used (assigned to the mapping function). That is, when an apparent causal relationship exists between the input local-feature-value vector and the local-feature-value vector obtained through mapping, instead of executing mapping using all the components of the input local-feature-value vector, mapping may be executed using only components considered as having a causal relationship.

Referring back to the flowchart shown in FIG. 3, in step S15, when mapping has been executed by the mapping unit 15, the result of the mapping is supplied to the face recognizer 17. In step S16, the face recognizer 17 reads registered face-image data (a set of local-feature-value vectors extracted from the registered face relevant to recognition) from the database 16. When a plurality of pieces of registered face-image data have been registered (i.e., when face-image data of a plurality of persons has been registered so that the plurality of persons can be recognized), the plurality of pieces of face-image data that have been registered is read.

In step S17, the face recognizer 17 calculates a similarity vector. The similarity vector is calculated by associating individual feature positions between the input face and the registered face and using the local-feature-value vectors of the associated feature positions. The similarity vector is calculated, for example, by calculating normalized correlation.

The description will be continued assuming that the face recognizer 17 calculates the similarity vector by calculating normalized correlation. The face recognizer 17 calculates the similarity vector by calculating normalized correlation according to expressions (17) and (18) below:

$$c_i^0 = NC(J_i^0, \tilde{J}_i^0) \quad (17)$$

$$C_d^0 = \{c_1^0, c_2^0, \ldots, c_n^0\} \quad (18)$$

The components in expressions (8) and (11) are assigned to expression (17) to calculate components of the similarity vector expressed in expression (18). That is, the similarities between the input face and the registered face at the same feature positions is calculated according to expression (17) using the local-feature-value vectors of the input face (the local-feature-value vectors obtained through mapping), expressed in expression (11), and the local-feature-value vectors of the registered face (the local-feature-value vectors registered in the database 16), expressed in expression (8).

From the similarities $C_i^0$ calculated according to expression (17), a similarity vector $C_d^0$ composed of a set of the similarities $C_i^0$ is calculated. The lower index "d" ranges from 1 to the number of faces relevant to recognition and registered in the database 16 (the number of pieces of registered face-image data). The similarity vector with the input face is calculated for each piece of registered face-image data in the manner described above.

When the similarity vector has been calculated in step S17, in step S18, the face recognizer 17 checks whether the input face corresponds to the face registered in the database 16 and relevant to recognition (i.e., whether the input face and the registered face represent the same person), and outputs the result of checking to an external device or the like (not shown). The checking can be executed using a classifier, for example, a support vector machine (SVM), a neural network, or Adaboost.

The description will be given in the context of an example where a support vector machine (SVM) is used. Now, a general description of SVM will be given briefly. Support vector machines are described, for example, in B. Sholkopf, C. Burges, A. Smola, Advance in Kernel Support Vector Learning, The MIT Press, 1999).

A support vector machine is a learning machine in which a linear classifier (perceptron) is used as a discriminant function, and the support vector machine can be extended for a non-linear space by using a kernel function. Furthermore, since maximum margins are provided for class separation in learning of the discriminant function and the solution can be obtained by solving a quadratic mathematical programming problem, the existence of a global solution is theoretically ensured.

Usually, a pattern recognition problem is equivalent to calculating a discriminant function f(x) for a test sample x=(x1, x2, ..., xn), expressed in the following expression:

$$f(x) = \sum_l^0 w_r X_r + b \quad (19)$$

Now, let a teacher label for learning by the support vector machine be expressed as follows:

$$y = (y1, y2, \ldots, yn) \quad (20)$$

Then, the recognition of a face pattern by the support vector machine can be considered as the problem of minimizing the square of a weight factor w under the constraint expressed in the following expression:

$$y_1 = (w^T x_1 + b) \geq 1 \quad (21)$$

The problem under the constraint can be solved using Lagrange's method of undetermined constants. More specifically, Lagrange expressed in expression (22) is first introduced and partially differentiated with respect to each of b and w expressed in expression (23):

$$L(w, b, a) = \frac{1}{2}\|w\|^2 - \sum_{i=1}^{l} a_i (y_i ((x_i{}^T w + b) - 1)) \quad (22)$$

$$\frac{\partial L}{\partial b} = \frac{\partial L}{\partial w} = 0 \quad (23)$$

Thus, the recognition of a face pattern by the support vector machine can be considered as a quadratic planning problem expressed as follows:

$$\max \sum ai - \frac{1}{2} \sum aiaiyiyi^T xj \quad (24)$$

Constraint $ai \geq 0$, $$\sum aiyi = 0$$

When the dimensionality of the feature space is less than the number of training samples, a slack variable $\xi \geq$ is introduced to modify the constraint as in the following expression:

$$y_1(w^T x_1 + b) \geq 1 - \xi_1 \quad (25)$$

Optimization is achieved by minimizing the value of the following objective function:

$$\frac{1}{2}\|w\|^2 + c \sum \xi_1 \quad (26)$$

In expression (26), C is a coefficient specifying a degree of slacking of the constraint, and the value thereof is to be determined experimentally. The problem regarding the Lagrange constant a can be rewritten as in the following expression:

$$\max \Sigma ai - \frac{1}{2}\Sigma aiaiyiyi^T xj$$

Constraint: $0 \leq ai \leq 0$, $\Sigma aiyi = 0$ \quad (27)

However, it is not possible to solve a non-linear problem using expression (27) as it is. Thus, for example, a kernel function K(x, x3) is introduced for temporary mapping to a higher-dimensional space (i.e., a kernel trick is performed), and linear separation is executed in that space. This is equivalent to non-linear separation in the original space.

The kernel function can be expressed as in the following expression using certain mapping Φ:

$$K(x, y) = \Phi(x)^T \Phi(x^i) \quad (28)$$

The discriminant function expressed in expression (19) can be expressed as expression (29) below:

$$f(\Phi(x)) = w^T \Phi(x) + b \quad (29)$$

$$= \sum aiyiK(x, xi) + b$$

The face recognizer 17 executes face recognition by the support vector machine (i.e., checking according to expression (29)) described above. The support vector machine checks matching with the registered face by calculating the distance from a boundary plane (with a value of 0) for determining the value of f(x) corresponding to the plane of the similarity vector (expression (29)), for example, as +1 or −1. That is, when a similarity vector matching the registered face does not exist, it is determined that the face of an unregistered person has been input. On the other hand, when a similarity vector matching the registered face exists, it is determined that the face of the registered person has been input.

The face recognizer 17 executes the checking described above according to expression (30) below. Expression (30) represents expression (29) in the form of a sgn function together with other expressions such as expressions (17) and (18). The sgn function takes the form of sgn(<value>), and is used to check the sign of a value. The sgn function returns "1" when the value in the parentheses is positive, "−1" when the value in the parentheses is negative, and "0" when the value in the parentheses is 0.

$$y = f(x) = sgn\left(\sum_{d=1}^{l} \alpha_d y_d K(C_d, C) + b\right) \quad (30)$$

Referring back to the flowchart shown in FIG. 3, in step S18, the face recognizer 17 checks whether a registered face matching the input face exists in the database 16, and outputs a result of checking to a device, for example, a display, where the result of checking is displayed as a message or the like.

When a registered face matching the input face exists in the database 16, information regarding the person associated with the matching registered face, such as a name, is read from the database 16, and the information is output as the result of checking. The device at the destination displays or otherwise uses the information.

When no registered face matching the input face exists in the database 16, information indicating the absence of a matching registered face is output as the result of checking, and, for example, the device at the destination displays a message such as "unregistered person" or issues an alarm.

As described above, in this embodiment, when the directions of the input face and the registered face differ, processing is executed so that the direction of the input face matches the direction of the registered face. The processing is executed by mapping local-feature-value vectors extracted from the input face (the image of the input face) according to a mapping function so that the local-feature-value vectors can be considered as local-feature-value vectors extracted from an input face with a direction matching the direction of the registered face.

As described above, the difference between the directions of the input face and the registered face is absorbed by mapping local-feature-value vectors before executing recognition. That is, in contrast to techniques that have hitherto been used, according to this embodiment, instead of synthesizing an entire face image captured from a different direction, feature values at a number of feature points in a face image are estimated. Thus, the following advantages can be expected.

First, since calculations regarding parts that are not used for recognition are refrained, so that redundant processing is avoided and recognition can be executed efficiently. The parts that are not used for recognition refer to the forehead, the cheeks, etc. By not using these parts for recognition, the amount of data used for calculation can be reduced, so that the amount of calculation can be reduced. Accordingly, recognition can be executed efficiently.

As described earlier, in the database 16, the face (person) relevant to recognition is registered. The content registered includes local-feature-value vectors extracted from the registered face (e.g., a set of data expressed in expression (8)). Furthermore, in order to allow recognition of the identity of the person associated with the registered local-feature-value vectors, for example, a name (nickname) is registered in association with the data of the local-feature-value vectors.

The data (registered face-image data) is obtained and registered through the processing executed by the image input unit 11 to the local-feature-value calculator 14 (FIG. 1). For example, in an initial period of usage of the image processing apparatus 10, processing for registration is executed so that registered face-image data is registered in the database 16. At the time of registration, local-feature-value vectors from the local-feature-value calculator 14 may be supplied to the database 16. Since the registered face is not necessarily a face image captured from the front, local-feature-value vectors obtained through mapping by the mapping unit 15 may be registered in the database 16.

As described above, in this embodiment, the mapping unit 15 executes mapping of local-feature-value vectors. The mapping functions used for the mapping are registered in the database 16 in advance to execution of recognition. The registered mapping functions are obtained, for example, from a plurality of face images used as samples. That is, for example, even when the image processing apparatus 10 is mounted on a device used at home and the face relevant to recognition by the image processing apparatus 10 is a face of a member of the family using the device, mapping functions that are different from mapping functions obtained from a face image of the family member (actual user) are registered in the database 16.

Therefore, when the mapping functions registered in the database 16 are not suitable for mapping regarding the person relevant to recognition (registered face), the accuracy of recognition is degraded. Thus, learning is allowed so that the mapping functions can be updated so as to be suitable for the person relevant to recognition.

Image Processing Apparatus with Learning Function

Figure 5:
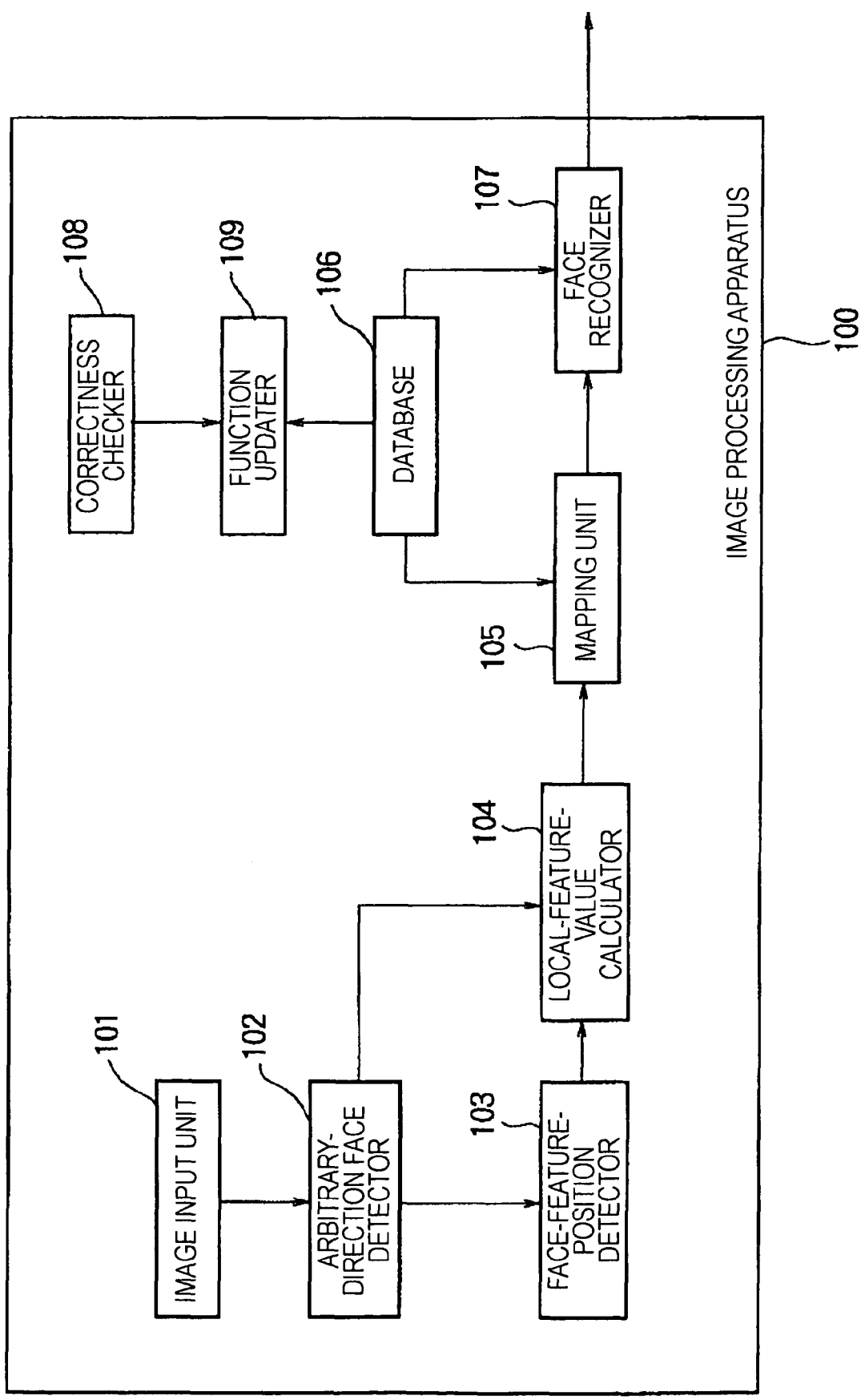
FIG. 5 is a diagram showing yet another example of the configuration of an image processing apparatus.

FIG. 5 shows an example of the configuration of an image processing apparatus in which mapping functions can be updated through learning. An image processing apparatus 100 shown in FIG. 5 includes an image input unit 101, an arbitrary-direction face detector 102, a face-feature-position detector 103, a local-feature-value calculator 104, a mapping unit 105, a database 106, a face recognizer 107, a correctness checker 108, and a function updater 109.

As compared with the image processing apparatus 10 shown in FIG. 1, the image processing apparatus 100 shown in FIG. 1, additionally includes the correctness checker 108 and the function updater 109. That is, the image input unit 101, the arbitrary-direction face detector 102, the face-feature-position detector 103, the local-feature-value calculator 104, the mapping unit 105, the database 106, and the face recognizer 107 of the image processing apparatus 100 are configured the same as the image input unit 11, the arbitrary-direction face detector 12, the face-feature-position detector 13, the local-feature-value calculator 14, the mapping unit 15, the database 16, and the face recognizer 17 of the image processing apparatus 10, respectively. In the following description, description of the parts configured the same as the corresponding parts of the image processing apparatus 10 will be omitted as appropriate.

Also, the image processing apparatus 100 shown in FIG. 5 may include the face-direction detector 31 shown in FIG. 2.

The correctness checker 108 is configured to accept an instruction from the user. More specifically, when the user has determined whether a result of recognition output from the face recognizer 107 is correct, the correctness checker 108 accepts the result of determination by the user. Furthermore, the correctness checker 108 supplies information indicating whether the result of recognition has been determined as correct or incorrect to the function updater 109.

The function updater 109 updates the mapping functions registered in the function updater 109 when the information supplied from the correctness checker 108 indicates that the result of recognition is incorrect.

Figure 6:
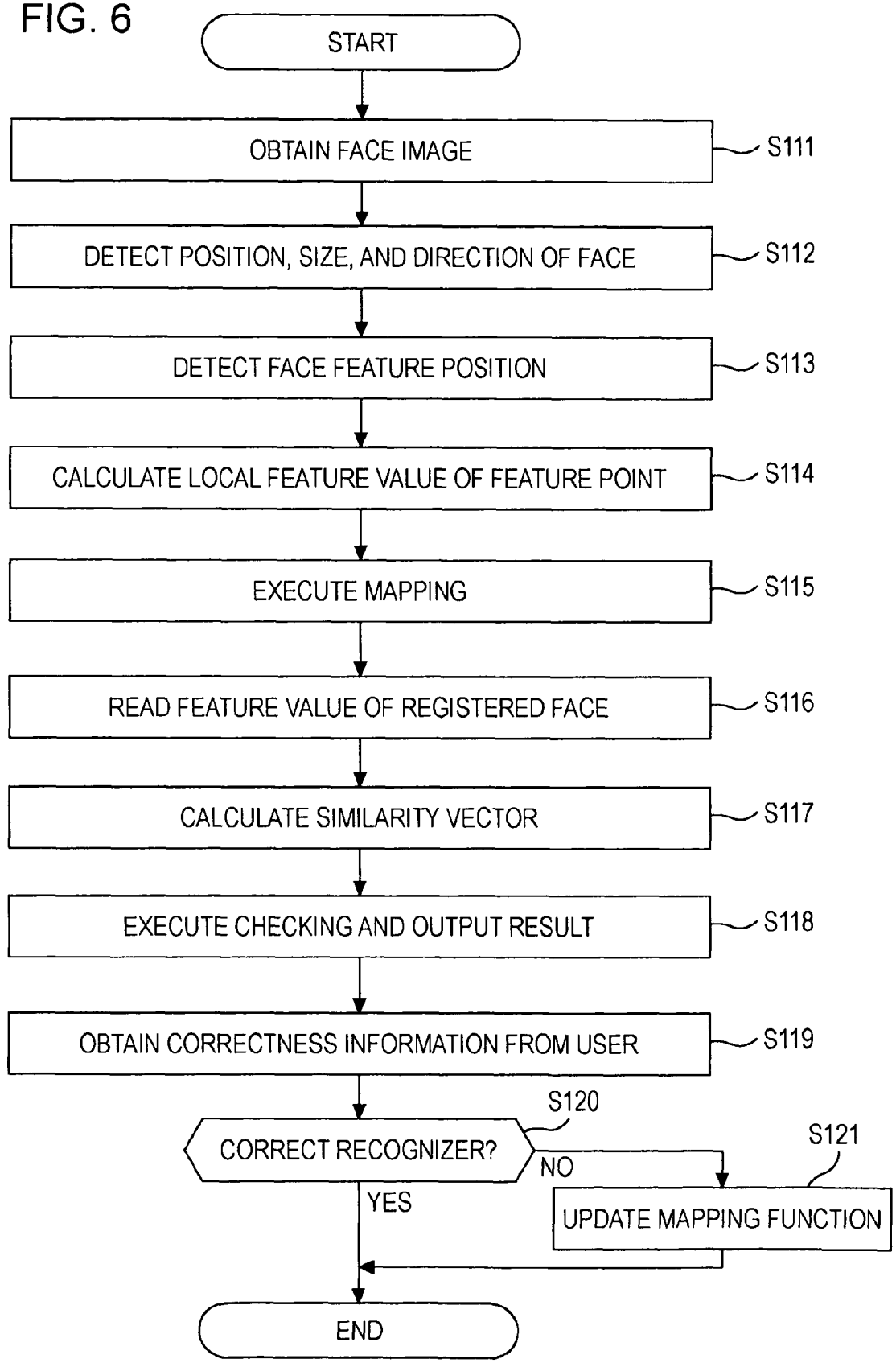
FIG. 6 is a flowchart of a learning process executed by an image processing apparatus.

Now, an operation of the image processing apparatus 100 shown in FIG. 5 will be described with reference to a flowchart shown in FIG. 6. Steps S111 to S118 are the same as steps S11 to S18 shown in FIG. 3, so that detailed description thereof will be omitted. That is, the image input unit 101 to the face recognizer 107 execute steps S111 to S118, whereby a result of recognition is provided to the user of the image processing apparatus 100.

As described earlier, the result of recognition is provided to the user, for example, by displaying a message on a display. The user determines whether the result of recognition is correct, and inputs the result of determination to the correctness checker 108. The correctness checker 108 includes an operation unit that allows the user to input the result of determination, for example, an operation unit having a button that is operated when the result of recognition is correct and a button that is operated when the result of recognition is incorrect.

Since the mapping functions are updated when the result of recognition is incorrect as will be described later, it suffices for the correctness checker 108 to have at least an arrangement for indicating incorrectness when the result of recognition is incorrect (e.g., only a button that is operated when the result of recognition is incorrect).

In step S119, the correctness checker 108 obtains correctness information from the user, indicating whether the result of recognition is correct or incorrect. On the basis of the correctness information, the correctness checker 108 checks whether the user has determined that the result of recognition is correct, and supplies the result of checking to the function updater 109.

In step S120, the function updater 109 determines whether the result of checking supplied from the correctness checker 108 indicates a correct result. When it is determined in step S120 that the result of checking indicates a correct result, the learning process shown in FIG. 6 is exited. In this case, since the result of recognition is correct, it is presumed that the mapping functions are suitable and can be used without updating. Thus, the process is exited without updating the mapping functions.

On the other hand, when it is determined in step S120 that the result of checking supplied from the correctness checker 108 does not indicate a correct result (i.e., indicates an incorrect result), the process proceeds to step S121. In step S121, the function updater 109 updates the mapping functions stored in the database 106.

As described above, the mapping functions registered in the database 106 are updated to mapping functions that serve to achieve correct recognition when the result of recognition is incorrect. That is, through the learning process, the mapping functions are updated to mapping functions suitable for users of the image processing apparatus 100 (persons relevant to recognition).

Since the mapping functions are updated as described above, functions that can be updated through the learning process and that serve to achieve mapping suitably are chosen as the mapping functions. The mapping functions may be, for example, may be functions based on support vector regression (SVR).

The mapping functions f in expression (12) given earlier may be functions based on SVR. In SVR, using a multidimensional input/one-dimensional output function estimating method that allows approximation of non-linear functions, local-feature-value vectors of feature points of face images of a large number of persons captured from various directions are learned in advance to obtain the mapping functions in expression (12). Furthermore, when local feature values have linearity in relation to face angles, the functions f may be estimated by way of linear regression analysis.

The mapping functions f can be learned using face-image data of the same person captured from different directions. That is, as described earlier, when a limited number of persons, such as family members, are to be recognized, face-image data of the same persons captured from different directions can be readily obtained, so that the learning process can be executed favorably. Particularly, when functions are learned by way of support vector regression (SVR), functions can be learned when desired using a method called the accurate online SVR (AOSVR). Thus, it is possible to execute additional learning or re-learning for adaptation to specific persons (e.g., family members) or environment after the shipping of a product including the image processing apparatus 100.

As described above, according to this embodiment, when arbitrary-viewpoint face recognition (face recognition that does not depend on the direction of an input face) is executed, three-dimensional data (three-dimensional model) is not used, and learning can be executed when desired. Thus, after mapping functions have been registered in the database 106 (e.g., after the shipping of a device including the image processing apparatus 100), it is possible to execute additional learning or re-learning for adaptation to specific persons or environment (situation where the device is used). Since additional learning and re-learning (updating of mapping functions) are allowed, it is possible to construct a recognition device (image processing apparatus) with a high accuracy.

Furthermore, when arbitrary-viewpoint face recognition is executed, since feature values at a number of feature points of a face image are estimated instead of synthesizing the entirety of a face image captured from a different direction, calculations regarding parts that are not relevant to recognition can be avoided. Thus, it is possible to construct a recognition device with a high efficiency of calculation.

Although the embodiment has been described in the context of an example of face recognition, the present invention can be applied to devices for recognizing objects other than faces, such as automobiles. When objects such as automobiles are to be recognized, feature positions corresponding to features of the objects to be recognized are defined so that the objects can be recognized similarly to the embodiment described above.

Recording Medium

Figure 7:
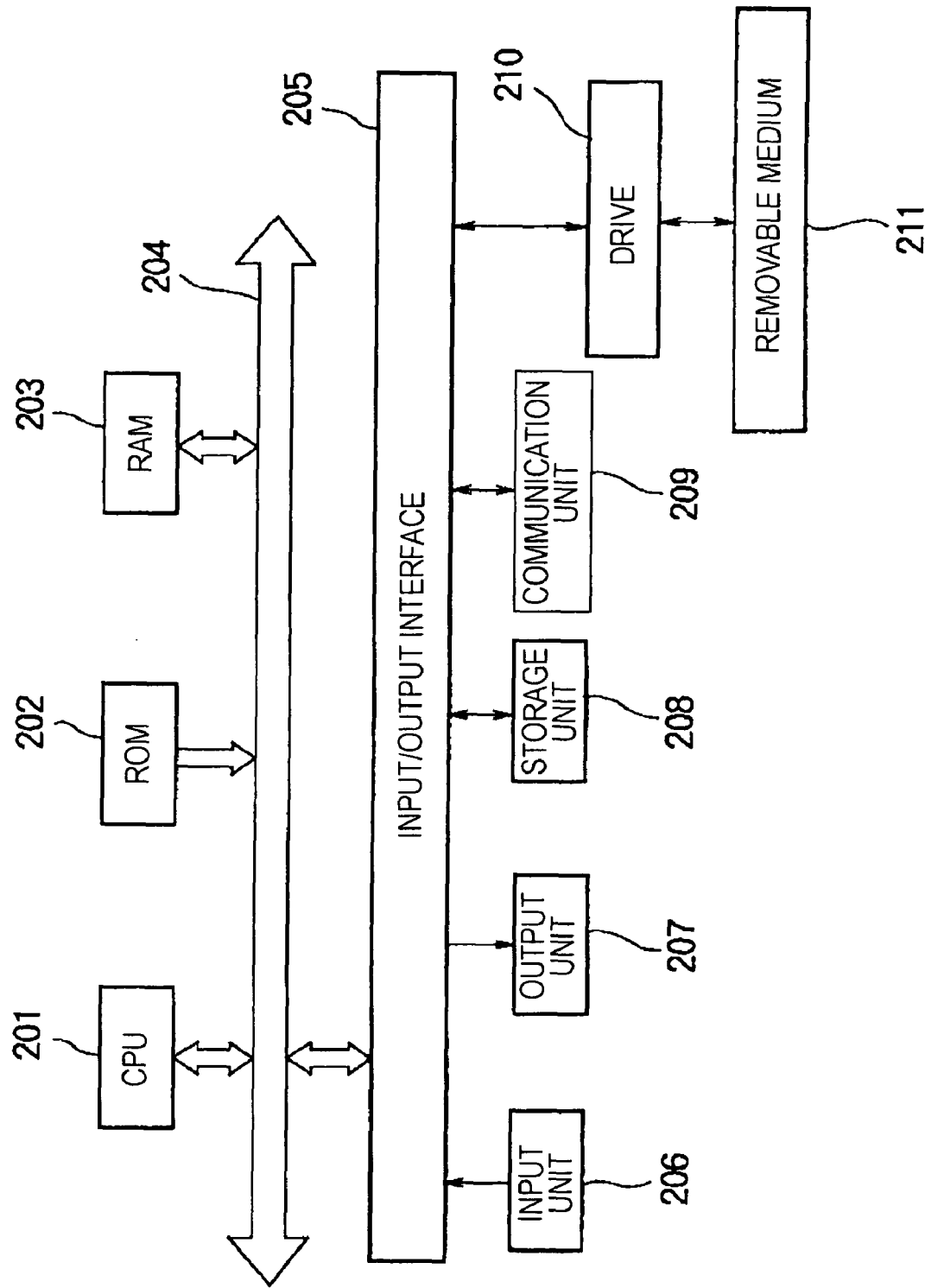
FIG. 7 is a diagram for explaining a recording medium.

FIG. 7 is a block diagram showing an example of the configuration of a personal computer that executes the processes described above according to programs. A central processing unit (CPU) 201 executes various processes according to programs stored in a read-only memory (ROM) 202 or a storage unit 208. A random access memory (RAM) 203 stores programs executed by the CPU 201, relevant data, etc. as needed. The CPU 201, the ROM 202, and the RAM 203 are connected to each other via a bus 204.

The CPU 201 is also connected to an input/output interface 205 via the bus 204. The input/output interface 205 is connected to an input unit 206 including a keyboard, a mouse, a microphone, etc., and to an output unit 207 including a display, a speaker, etc. The CPU 201 executes various processes according to instructions input from the input unit 206. The CPU 201 then outputs results of the processes to the output unit 207.

The storage unit 208 connected to the input/output interface 205 is formed of, for example, a hard disc, and it stores programs executed by the CPU 201 and various relevant data. A communication unit 209 carries out communication with external devices via networks, such as the Internet or local area networks.

Also, it is possible to obtain programs via the communication unit 209 and to store the programs in the storage unit 208.

Furthermore, a drive 210 is connected to the input/output interface 205. When a removable medium 211, such as a magnetic disc, an optical disc, a magneto-optical disc, or a semiconductor memory, is mounted on the drive 210, the drive 210 drives the removable medium 211 to obtain programs, data, etc. recorded thereon. The programs, data, etc. that have been obtained are transferred to and stored in the storage unit 208 as needed.

The series of processes described above can be executed by hardware or software. When the series of processes are executed by software, programs constituting the software is installed from a program storage medium onto a computer embedded in special hardware or onto a general-purpose personal computer or the like that is capable of executing various functions with various programs installed thereon.

As shown in FIG. 7, the program storage medium for storing programs that are installed onto a computer for execution by the computer may be the removable medium 211, which is a package medium such as a magnetic disc (e.g., a flexible disc), an optical disc (e.g., a CD-ROM (compact disc read-only memory) or a DVD (digital versatile disc)), a magneto-optical disc (e.g., an MD (mini-disc)), or a semiconductor memory, or the ROM 202 or the hard disc of the storage unit 208 temporarily or permanently storing the programs. The programs can be stored on the program storage medium as needed via the communication unit 209, which is an interface, such as a router or a modem, using wired or wireless communication medium, such as a local area network, the Internet, or digital satellite broadcasting.

It is to be understood that steps defining the programs stored on the program storage medium may include processes that are executed in parallel or individually, as well as processes that are executed in the orders described in this specification.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    face-image detecting means for detecting a region of a face image from an image supplied thereto;
    face-direction detecting means for detecting a direction that a face in the face image detected by the face-image detecting means is facing;
    feature-position detecting means for selecting an appropriate feature-position detecting means from a plurality of feature-position detecting means on the basis of the direction of the face detected by the face-direction detecting means, for supplying the face image detected by the face-image detecting means to the selected appropriate feature-position detecting means, and for detecting feature positions corresponding to features of the face from the face image detected by the face-image detecting means and the direction of the face detected by the face-direction detecting means;
    feature-value calculating means for calculating feature values at the feature positions detected by the feature-position detecting means;
    mapping means for mapping the feature values calculated by the feature-value calculating means, using predetermined mapping functions; and
    recognizing means for recognizing whether the face detected by the face-image detecting means is a registered face, using the feature values mapped by the mapping means and feature values registered in advance,
    wherein the face-direction detecting means adjusts precision of the detected direction to match precision of face-direction information appropriate for the feature-position detecting means, and
    wherein when the direction of the detected face differs from a direction of the registered face, local-feature-value vectors extracted from the detected face are mapped using the predetermined mapping functions so that difference between the direction of the detected face and the direction of the registered face is absorbed for recognition.

2. The image processing apparatus according to claim 1, wherein the feature-value calculating means calculates the feature values using Gabor filters or Gaussian derivative filters.

3. The image processing apparatus according to claim 1, wherein the mapping means uses support-vector-regression functions as the mapping functions.

4. The image processing apparatus according to claim 1, wherein the mapping means maps at least one component among components of the feature values calculated by the feature-value calculating means, using the mapping functions.

5. The image processing apparatus according to claim 1, further comprising:
    updating means for updating the mapping functions when a result of recognition by the recognizing means is incorrect.

6. An image processing method, executed by a processor, the method comprising the steps of:
    detecting a region of a face image from an image supplied, utilizing a face-image detector;
    detecting a direction that a face in the detected face image is facing, utilizing a face-direction detector;
    selecting an appropriate feature-position detector from a plurality of feature-position detectors on the basis of the direction of the face, utilizing a feature-position detector;
    supplying the face image to the selected appropriate feature-position detector, utilizing a feature-position detector;
    detecting feature positions corresponding to features of the face from the detected face image and the detected direction of the face, utilizing a feature-position detector;
    calculating feature values at the detected feature positions, utilizing a feature-value calculator;
    mapping the calculated feature values using predetermined mapping functions, utilizing a mapper; and
    recognizing whether the detected face is a registered face using the mapped feature values and feature values registered in advance, utilizing a recognizer, wherein the step of detecting a direction adjusts precision of the detected direction to match precision of face-direction information appropriate for the step of detecting feature positions, and wherein when the direction of the detected face differs from a direction of the registered face, local-feature-value vectors extracted from the detected face are mapped using the predetermined mapping functions so that difference between the direction of the detected face and the direction of the registered face is absorbed for recognition.

7. A non-transitory computer-readable medium storing a computer program that when executed on a computer causes image processing, the program comprising the steps of:

detecting a region of a face image from an image supplied;
detecting a direction that a face in the detected face image is facing;
selecting an appropriate feature-position detector from a plurality of feature-position detectors on the basis of the direction of the face;
supplying the face image to the selected appropriate feature-position detector;
detecting feature positions corresponding to features of the face from the detected face image and the detected direction of the face;
calculating feature values at the detected feature positions;
mapping the calculated feature values using predetermined mapping functions; and
recognizing whether the detected face is a registered face using the mapped feature values and feature values registered in advance,
wherein the step of detecting a direction adjusts precision of the detected direction to match precision of face-direction information appropriate for the step of detecting feature positions, and
wherein when the direction of the detected face differs from a direction of the registered face, local-feature-value vectors extracted from the detected face are mapped using the predetermined mapping functions so that difference between the direction of the detected face and the direction of the registered face is absorbed for recognition.

8. An image processing apparatus comprising:

detecting means for detecting a predetermined object from an image supplied thereto;
direction detecting means for detecting a direction that the object detected by the detecting means is facing;
feature-position detecting means for selecting an appropriate feature-position detecting means from a plurality of feature-position detecting means on the basis of the direction detected by the direction detecting means, for supplying the image detected by the detecting means to the selected appropriate feature-position detecting means, and for detecting feature positions corresponding to features of the object from the object detected by the detecting means and the direction of the object detected by the direction detecting means;
feature-value calculating means for calculating feature values at the feature positions detected by the feature-position detecting means;
mapping means for mapping the feature values calculated by the feature-value calculating means, using predetermined mapping functions; and
recognizing means for recognizing whether the object detected by the detecting means is a registered object, using the feature values mapped by the mapping means and feature values registered in advance,
wherein direction detecting means adjusts precision of the detected direction to match precision of object-direction information appropriate for the feature-position detecting means, and
wherein when the direction of the detected object differs from a direction of the registered object, local-feature-value vectors extracted from the detected object are mapped using the predetermined mapping functions so that difference between the direction of the detected object and the direction of the registered object is absorbed for recognition.

9. The image processing apparatus according to claim 8, wherein the feature-value calculating means calculates the feature values using Gabor filters or Gaussian derivative filters.

10. The image processing apparatus according to claim 8, wherein the mapping means uses support-vector-regression functions as the mapping functions.

11. The image processing apparatus according to claim 8, wherein the mapping means maps at least one component among components of the feature values calculated by the feature-value calculating means, using the mapping functions.

12. The image processing apparatus according to claim 8, further comprising:

updating means for updating the mapping functions when a result of recognition by the recognizing means is incorrect.

13. An image processing method, executed by a processor, the method comprising the steps of:

detecting a predetermined object from an image supplied, utilizing a detector;
detecting a direction that the detected object is facing, utilizing a direction detector;
selecting an appropriate feature-position detector from a plurality of feature-position detectors on the basis of the direction, utilizing a feature-position detector,
supplying the image to the selected appropriate feature-position detector, utilizing a feature-position detector;
detecting feature positions corresponding to features of the object from the detected object and the detected direction of the object, utilizing a feature-position detector;
calculating feature values at the detected feature positions, utilizing a feature-value calculator;
mapping the calculated feature values using predetermined mapping functions, utilizing a mapper; and
recognizing whether the detected object is a registered object using the mapped feature values and feature values registered in advance, utilizing a recognizer,
wherein the step of detecting a direction adjusts precision of the detected direction to match precision of object-direction information appropriate for the step of detecting feature positions, and
wherein when the direction of the detected object differs from a direction of the registered object, local-feature-value vectors extracted from the detected object are mapped using the predetermined mapping functions so that difference between the direction of the detected object and the direction of the registered object is absorbed for recognition.

14. A non-transitory computer-readable medium storing a computer program that when executed on a computer causes image processing, the program comprising the steps of:

detecting a predetermined object from an image supplied;
detecting a direction that the detected object is facing;

selecting an appropriate feature-position detector from a plurality of feature-position detectors on the basis of the direction, supplying the image to the selected appropriate feature-position detector;

detecting feature positions corresponding to features of the object from the detected object and the detected direction of the object;

calculating feature values at the detected feature positions;

mapping the calculated feature values using predetermined mapping functions; and recognizing whether the detected object is a registered object using the mapped feature values and feature values registered in advance, wherein the step of detecting a direction adjusts precision of the detected direction to match precision of object-direction information appropriate for the step of detecting feature positions, and wherein when the direction of the detected object differs from a direction of the registered object, local-feature-value vectors extracted from the detected object are mapped using the predetermined mapping functions so that difference between the direction of the detected object and the direction of the registered object is absorbed for recognition.

15. An image processing apparatus comprising:

a face-image detector configured to detect a region of a face image from an image supplied thereto;

a face-direction detector configured to detect a direction that a face in the face image detected by the face-image detector is facing;

a feature-position detector configured to select an appropriate feature-position detector from a plurality of feature-position detectors on the basis of the direction of the face detected by the face-direction detector, supply the face image detected by the face-image detector to the selected appropriate feature-position detector, and detect feature positions corresponding to features of the face from the face image detected by the face-image detector and the direction of the face detected by the face-direction detector;

a feature-value calculator configured to calculate feature values at the feature positions detected by the feature-position detector;

a mapper configured to map the feature values calculated by the feature-value calculator, using predetermined mapping functions; and a recognizer configured to recognize whether the face detected by the face-image detector is a registered face, using the feature values mapped by the mapper and feature values registered in advance, wherein the face-direction detector adjusts precision of the detected direction to match precision of face-direction information appropriate for the feature-position detector, and wherein when the direction of the detected face differs from a direction of the registered face, local-feature-value vectors extracted from the detected face are mapped using the predetermined mapping functions so that difference between the direction of the detected face and the direction of the registered face is absorbed for recognition.

16. An image processing apparatus comprising:

a detector configured to detect a predetermined object from an image supplied thereto;

a direction detector configured to detect a direction that the object detected by the detector is facing;

a feature-position detector configured to select an appropriate feature-position detector from a plurality of feature-position detectors on the basis of the direction detected by the direction detector, supply the image detected by the detector to the selected appropriate feature-position detector, and detect feature positions corresponding to features of the object from the object detected by the detector and the direction of the object detected by the direction detector;

a feature-value calculator configured to calculate feature values at the feature positions detected by the feature-position detector;

a mapper configured to map the feature values calculated by the feature-value calculator, using predetermined mapping functions; and a recognizer configured to recognize whether the object detected by the detector is a registered object, using the feature values mapped by the mapper and feature values registered in advance, wherein the direction detector adjusts precision of the detected direction to match precision of object-direction information appropriate for the feature-position detector, and wherein when the direction of the detected object differs from a direction of the registered object, local-feature-value vectors extracted from the detected object are mapped using the predetermined mapping functions so that difference between the direction of the detected object and the direction of the registered object is absorbed for recognition.

* * * * *